T. BRENNAN, Jr.
GRAIN DRILL.
APPLICATION FILED MAY 24, 1910.
1,061,521.
Patented May 13, 1913.
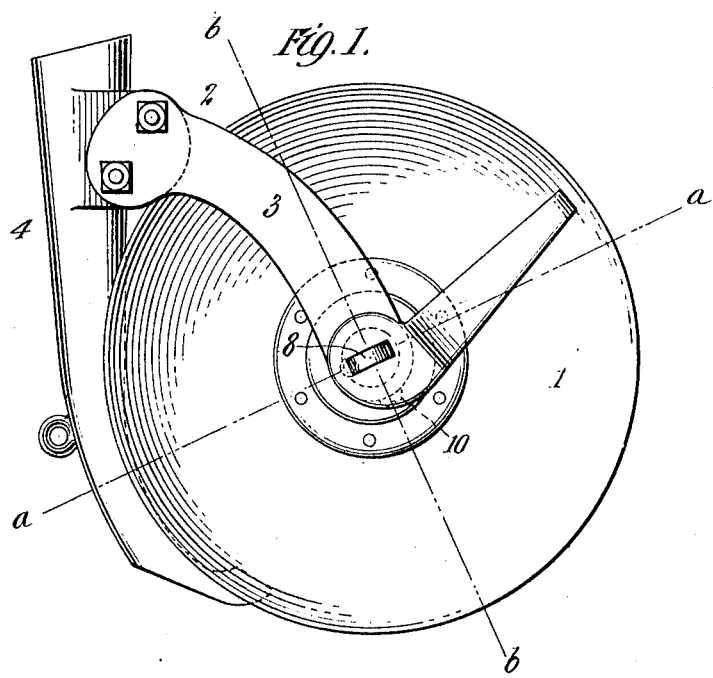
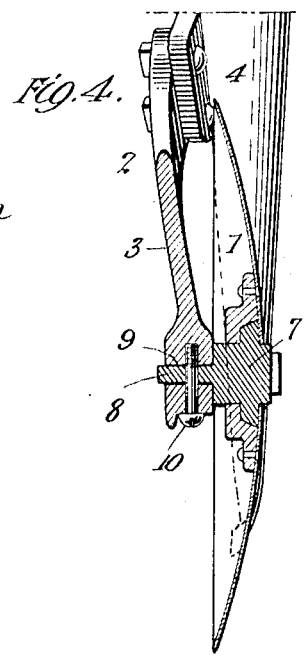
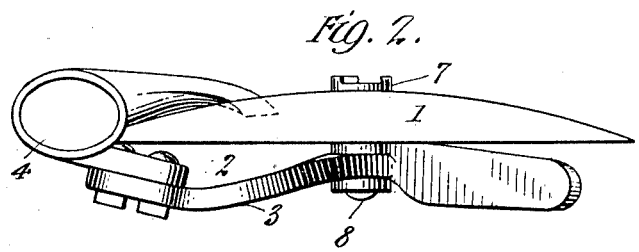
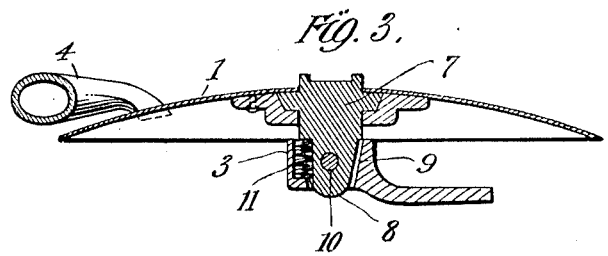
Witnesses:
Inventor
Thomas Brennan Jr
By his Attorney
Philip T. Dodge
COLUMBIA PLANOGRAPH CO., WASHINGTON, D. C.

UNITED STATES PATENT OFFICE.

THOMAS BRENNAN, JR., OF ST. LOUIS PARK, MINNESOTA, ASSIGNOR TO MONITOR DRILL COMPANY, A CORPORATION OF MINNESOTA.

GRAIN-DRILL.

1,061,521.  Specification of Letters Patent.  Patented May 13, 1913.

Application filed May 24, 1910. Serial No. 563,111.

*To all whom it may concern:*

Be it known that I, THOMAS BRENNAN, Jr., of St. Louis Park, county of Hennepin, and State of Minnesota, have invented a new and useful Improvement in Grain-Drills, of which the following is a specification.

This invention relates to seeding machines of the type in which the furrows to receive the seed are formed by opening disks, and in which the seed is directed into the furrows by seed tubes or conduits sustained with their delivery ends close to the side of the disks.

The invention has special reference to the relative mounting of the disk and tube, and consists in so sustaining these parts that one may oscillate relatively to the other on an axis extending parallel or substantially so with reference to the longitudinal axis of the tube. In its preferred form, the disk is so mounted that not only may it rotate as usual, but may also oscillate or tip with reference to the seed tube on an axis adjacent the axis of rotation but at an angle with relation thereto, the end of the seed tube being adapted to bear against the side of the disk, and means being provided to hold said parts in yielding engagement.

In the accompanying drawings: Figure 1 is a side elevation of a disk opener and seed tube or conduit constructed in accordance with my invention. Fig. 2 is a top plan view of the same. Fig. 3 is a horizontal section on the line *a—a* of Fig. 1. Fig. 4 is a vertical section on the line *b—b* of Fig. 1.

Referring to the drawings:—A furrow opening disk 1 is rotatably mounted on a frame 2, in the present instance in the form of a supporting arm 3 extending upwardly and rearwardly, the disk being mounted at the lower end of the arm, and an upright seed tube 4 being connected with the upper end of the arm with its lower end or toe being against the convex side of the disk. In practice, these disks are usually mounted in gang in the seeding machine, and are connected by means of drag bars (not shown) with the machine frame, so as to apply to the disks and tubes the necessary draft, the disks being so mounted on their supporting frames that they will extend at an angle with reference to the line of travel.

It is important for the proper and effective deposit of the seed uniformly and with certainty in the furrow, that the delivery end or toe of the seed tube maintains close contact with the face of the disk; and in order that this result may be accomplished, notwithstanding any irregularities or unevenness that may exist in the form or surface of the disk or its path of rotary movement, I so connect the disk with its support that the former may rock or oscillate to and from the seed tube, and I provide a spring so arranged that it will hold the disk and tube in yielding engagement, with the result that the disk will bear closely and flatly against the tube in its rotary motion. I prefer, in order to effect this result, to provide a disk supporting head 7, on which the disk is rotatably mounted, which head is formed on one end with a flattened extension or lug 8, extending outwardly at the concave side of the disk. The lug is seated in a horizontal opening 9 in the lower end of the arm 3, and pivoted therein on an upright axis by means of a pivoting screw or stud 10, extending upwardly through the end of the arm and through an opening in the lug. Sufficient clearance is given at the two ends of the opening to admit of a slight rocking or tipping motion of the lug therein; while the upper and lower sides of the opening are formed to snugly embrace the flat sides of the lug, whereby the lug will be evenly guided in its rocking motion, and the disk will be given firm support by the arm. As a result of this construction, it will be seen that while the disk may freely rotate on its supporting head, it may rock or oscillate to a limited extent on an upright axis formed by the pivoting screw 10, this rocking motion of the disk causing it to move bodily to and from the delivery end of the seed tube. In order that the disk may be held in engagement with the end of the seed tube, notwithstanding any unevenness in its path of rotation, or any irregularities in its surface, I provide a coiled spring 11, which is seated in a recess in the rear edge of the lug, with its inner end bearing against the bottom of the recess and its outer end bearing against the inner side of the opening in the frame, and tending by its expansion to shift the lug on its axis, thus acting to maintain the disk in engagement with the end of the seed tube. By this means, the disk is held yieldingly against the end of the tube, so that the engagement of the tube will be maintained under conditions which would otherwise cause the disk to separate from the end of the tube.

It will be observed that the axis on which one of the parts tips with reference to the other extends in an upright position and is substantially parallel with the longitudinal axis of the tube, being in the present embodiment of my invention situated in advance of the tube and intersecting the horizontal axis on which the disk rotates.

I deem the particular embodiment of the invention shown in the drawings the preferable one and what in practice has been found to operate with satisfactory results, but it will be understood, of course, that my invention is not limited to any particular form of construction of the parts except in so far as such limitations are specified in the claims.

Having thus described my invention, what I claim is:—

1. In a seeding machine, the combination with a seed tube, of a rotary opening disk sustained adjacent the tube, one of said parts being yieldable relatively to the other about an axis situated in advance of the tube and extending at an angle with reference to the axis of rotation of the disk.

2. In a seeding machine, the combination with a seed tube, of a rotary opening disk sustained adjacent the tube and yieldable relatively to the tube about an axis extending parallel or substantially so with the axis of the tube.

3. In a seeding machine, the combination with a seed tube, of a rotary opening disk sustained adjacent the tube and yieldable relatively to said tube on an axis situated in advance of the tube and extending at an angle with reference to the axis of rotation of the disk.

4. In a seeding machine, the combination with a rotary opening disk, of a seed tube sustained adjacent to the disk and contacting with the side of the same, the said disk being movable about an axis situated in advance of the tube and extending at an angle with relation to the axis of rotation of the disk, and means for holding the disk in yielding engagement with the tube.

5. In a seeding machine, the combination with a seed tube, of a rotary disk movably supported adjacent to its axis of rotation and adapted to rock on its support relatively to the tube on an axis extending at an angle to the axis of rotation of the disk, and means for holding the disk and tube in yielding engagement with each other.

6. In a seeding machine, the combination with a seed tube, of a rotary disk mounted to oscillate relatively to the tube on an axis intersecting the axis of rotation but extending at an angle with reference to said axis of rotation.

7. In a seeding machine, and in combination with a frame or support, an opening disk rotatably mounted on said frame and movable relatively to the frame about an axis extending at an angle with reference to the axis of rotation, and means acting to yieldingly restrain the disks against movement on said axis.

8. In a seeding machine, and in combination with a supporting frame, an opening disk, and a supporting head on which said disk is rotatably mounted, said head being pivoted to the frame at a point adjacent the center of the disk, and means acting to yieldingly restrain said head against pivotal movement.

9. In a seeding machine, and in combination with a frame or support, a seed tube fixedly connected therewith, a rotary opening disk sustained by said frame at a point adjacent the axis of rotation of the disk and movable at said point of support relatively to the tube on an axis angularly related to the axis of rotation, and means for holding the disk and tube in yielding engagement with each other.

10. In a seeding machine, the combination with a frame, of a seed tube carried thereby, a disk supporting head mounted to rock on the frame, a disk rotatably mounted on the head and movable to and from the tube in the rocking movements of the head, and a spring bearing against the head and frame respectively and tending to shift the head so as to hold the tube and disk in yielding engagement.

11. In a seeding machine, the combination with a supporting arm, of an upright disk pivoted to said supporting arm on an upright axis and rotatable around a horizontal axis, an upright seed tube fixedly connected with said arm and adapted at its lower end to bear against the side of the disk, and a spring acting to hold said parts in yielding engagement.

12. In a seeding machine, the combination with a frame or support having an opening therethrough, a disk supporting head having a lug pivoted in said opening, a disk rotatably mounted on said head, a seed tube in relation to which said disk oscillates on said pivotal axis, and a spring acting to maintain the disk in yielding engagement with the tube.

In testimony whereof I hereunto set my hand this 17th day of May, 1910, in the presence of two attesting witnesses.

THOMAS BRENNAN, Jr.

Witnesses:
E. R. BRENNAN,
T. S. PRESTON.